US012011845B2

(12) United States Patent
Zhu et al.

(10) Patent No.: US 12,011,845 B2
(45) Date of Patent: Jun. 18, 2024

(54) CONSTRUCTION OF STRUCTURAL MATERIALS FROM LUMBER USING A CARBONATE OR OXYGEN PRE-TREATMENT AND DENSIFICATION

(71) Applicants: The United States, as represented by the Secretary of Agriculture, Washington, DC (US); Jiaqi Dai, Washington, DC (US); Yelizaveta Pikus, Phoenix, AZ (US)

(72) Inventors: Junyong Zhu, Madison, WI (US); Roland Gleisner, Jefferson, WI (US); Riley Simson, Madison, WI (US); Jiaqi Dai, Washington, DC (US); Yelizaveta Pikus, Phoenix, AZ (US)

( * ) Notice: Subject to any disclaimer, the term of this patent is extended or adjusted under 35 U.S.C. 154(b) by 0 days.

(21) Appl. No.: 17/864,763

(22) Filed: Jul. 14, 2022

(65) Prior Publication Data

US 2023/0029556 A1 Feb. 2, 2023

Related U.S. Application Data

(60) Provisional application No. 63/221,968, filed on Jul. 15, 2021.

(51) Int. Cl.

| | |
|---|---|
| ***B27K 5/06*** | (2006.01) |
| ***B27K 3/08*** | (2006.01) |
| ***B27K 3/18*** | (2006.01) |
| ***B27K 3/32*** | (2006.01) |

(52) U.S. Cl.
CPC ................ *B27K 5/065* (2013.01); *B27K 3/08* (2013.01); *B27K 3/18* (2013.01); *B27K 3/32* (2013.01)

(58) Field of Classification Search
CPC ... B27K 3/20; B27K 3/08; B27K 3/18; B27K 3/32; B27K 5/007
See application file for complete search history.

(56) References Cited

U.S. PATENT DOCUMENTS

| | | | | |
|---|---|---|---|---|
| 3,888,727 | A * | 6/1975 | Kenig | D21C 3/263 8/111 |
| 7,824,521 | B2 | 11/2010 | van Heiningen et al. | |
| 8,715,969 | B2 | 5/2014 | Sabesan et al. | |
| 10,266,610 | B2 | 4/2019 | Varhimo et al. | |
| 10,273,633 | B2 | 4/2019 | Banzashi et al. | |
| 2020/0238565 | A1 * | 7/2020 | Hu | B27K 3/0207 |
| 2021/0147952 | A1 | 5/2021 | Eyal et al. | |
| 2021/0269837 | A1 | 9/2021 | Jin et al. | |

OTHER PUBLICATIONS

Maria Fiserova et al., "Hemicelluloses Extraction From Beech Wood With Water and Alkaline Solutions," *Wood Research* 2012, vol. 54, No. 4; pp. 505-514.

(Continued)

*Primary Examiner* — Michael P Wieczorek

(57) ABSTRACT

Methods for producing structural materials from lumber are provided. The methods use an oxygen pre-treatment or a carbonate pre-treatment followed by densification via thermal compression to produce structural materials with strong mechanical properties. The pre-treatments are able to partially delignify the lumber without substantially adversely affecting the mechanical properties of the subsequently densified wood.

16 Claims, 3 Drawing Sheets

(56) References Cited

OTHER PUBLICATIONS

Shi et al., "Fabrication of densified wood via synergy of chemical pretreatment, hot-pressing and post mechanical fixation," *J Wood Sci.* (2020); vol. 66, No. 5; pp. 1-9.
Sarah Augustina et al., "Effect of Sodium Hydroxide, Succinic Acid and Their Combination on Densified Wood Properties," *Forests* 2022, vol. 13, 293; pp. 1-14. https://doi.org/10.3390/f13020293.
"Oxygen Delignification," Linde Industrial Gases publication available online on or before Jul. 1, 2022; pp. 1-2.
Jianwei Song et al., "Processing bulk natural wood into a high-performance structural material," *Nature* Feb. 8, 2018, vol. 554; pp. 1-16.
Yu Liu et al., "Strong Cellulose-Based Materials by Coupling Sodium Hydroxide-Anthraquinone (NaOH—AQ) Pulping with Hot Pressing from Wood," *ACS Omega* 2019, vol. 4; pp. 7861-7865.
Yun Ji, "Kinetics and Mechanism of Oxygen Delignification" (2007). *Electronic Theses and Dissertations.* 227. http://digitalcommons.library.umaine.edu/etd/227.
Jiajun Wang et al., "Properties of densified poplar wood through partial delignification with alkali and acid pretreatment," *J Mater Sci* (2020), vol. 55: pp. 14664-14676.

* cited by examiner

CONSTRUCTION OF STRUCTURAL MATERIALS FROM LUMBER USING A CARBONATE OR OXYGEN PRE-TREATMENT AND DENSIFICATION

CROSS-REFERENCE TO RELATED APPLICATIONS

The present application claims priority to U.S. provisional patent application No. 63/221,968 that was filed Jul. 15, 2021, the entire contents of which are incorporated herein by reference.

FIELD OF THE INVENTIONS

The invention described herein relates to the field of chemical treatment of wood for improving wood mechanical properties.

BACKGROUND

Wood has long been used as a structural material. Its inherent renewability has attracted great interest recently in uses for many structural applications as an alternative to metals. Wood has a hierarchical structure and is highly porous, resulting in a lower density and lower thermal conductivity than metals, while still having very good mechanical strength. Increasing wood utilization can not only reduce carbon emissions through sequestration, but can also promote sustainable healthy forest management and rural economic development. Wood treatments, such as thermal, preservative, and impregnation, have been applied to improve wood mechanical strength, water resistance, and dimensional stability to meet end use performance for a variety of applications. Chemical modification of wood through acetylation is another way to preserve its longevity and end use performance. Wood densification through thermal treatment has also been applied to improve wood mechanical strength, especially for those woods with low densities, such as fast-growing poplar and paulownia wood.

Chemical delignification, including using hydrogen peroxide with acetic acid, was initially introduced to improve densification of resin-impregnated wood at low pressures. (Shams et al., 2005. *Journal of Wood Science,* 51(3), 234-238.) Near-complete delignification was also applied to produce a transparent wood film by infiltrating a refraction-index-matching polymer followed by densification. (Li et al., 2018. *Advanced Optical Materials,* 6(14); Zhu et al., 2016. *Nano Energy,* 26, 332-339.) The resultant densified wood film had significantly improved mechanical properties. Partial delignification of approximately 50% using an alkaline sulfite solution followed by densification was later applied and achieved approximately 10-fold increase in tensile strength of the densified wood. (Song et al., 2018. *Nature,* 554 (7691), 224-228.) Soda delignification using NaOH and anthraquinone (AQ) as a catalyst has also been applied for delignifying pine wood to produce strong wood through densification. (Liu et al., 2019. *ACS Omega,* 4(4), 7861-7865.) The study found that optimal delignification for achieving maximal strength for pine was at wood residual lignin content of 3.8%, substantially lower than the 11.3% for the first study using hardwood. (Song et al., 2018.)

Delignification represents a significant cost step with a potentially negative environmental impact. Delignification using sulfite or Soda-AQ applied for wood densification presents major environmental concerns resulting from difficulties in sulfite recovery and the carcinogenic properties of AQ which has been banned for food packaging. (Liu et al., 2019; Song et al., 2018; Hart & Rudie, 2014. *Tappi Journal,* 13(10), 23-31.) Using peroxide or chlorite bleaching to remove a substantial amount of lignin is cost prohibitive because of the high chemical dosage required for one-step wood delignification.

SUMMARY

Methods for producing structural materials from lumber are provided.

One embodiment of a method for producing a structural material from lumber includes the steps of: impregnating the lumber with an aqueous solution comprising a base; exposing the impregnated lumber to an oxygen-rich environment at an elevated delignification temperature in a pressurized vessel to partially delignify the lumber; and compressing the lumber at an elevated compression temperature to densify the lumber.

Another embodiment of a method for producing a structural material from lumber includes the steps of: subjecting the lumber to a hydrolysis at an elevated delignification temperature in the presence of an aqueous alkaline solution comprising an alkali carbonate in a pressurized vessel to partially delignify the lumber; and compressing the lumber at an elevated compression temperature to densify the lumber.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described.

DETAILED DESCRIPTION

Figure 1:
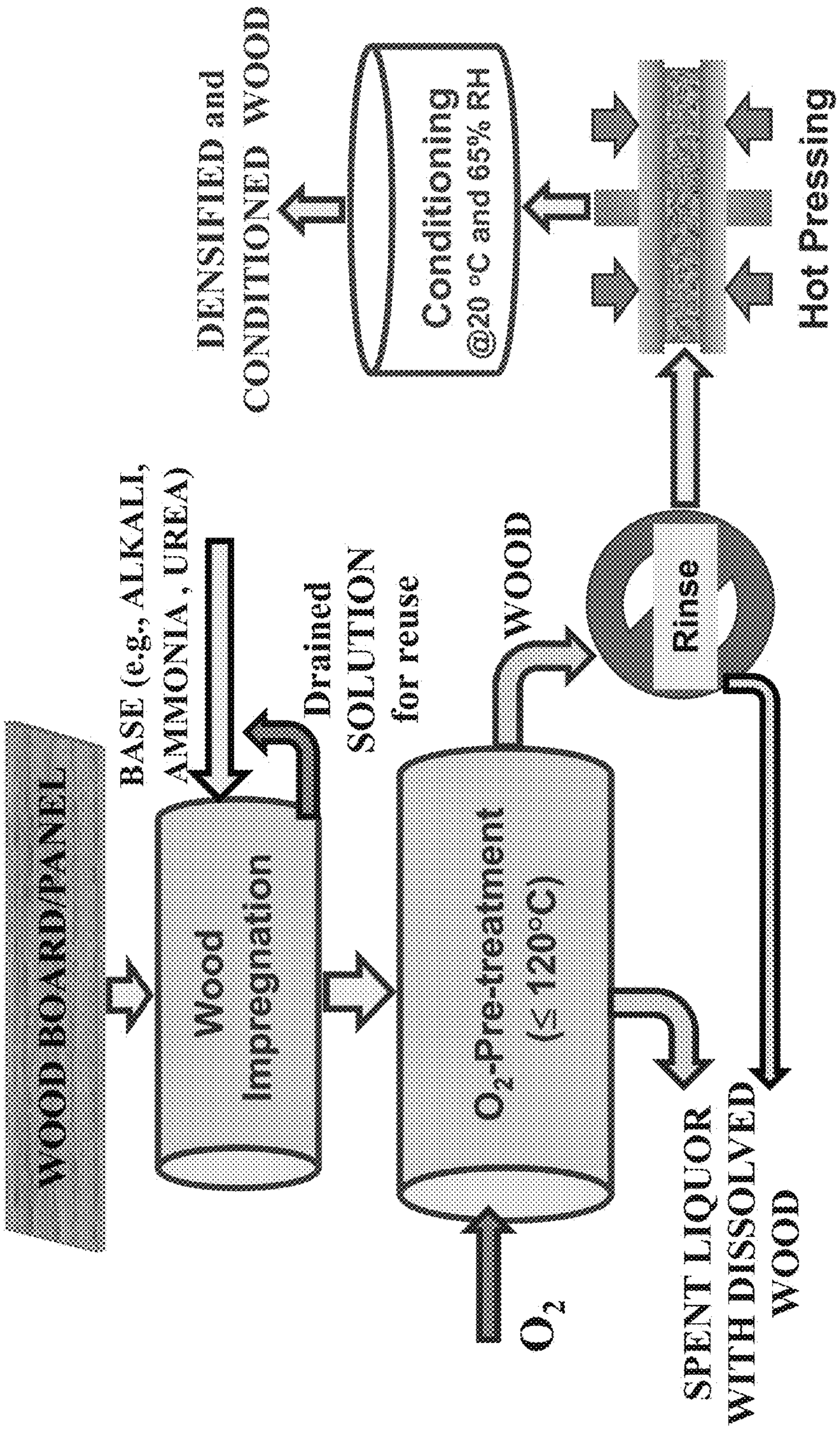
FIG. 1. A schematic flow diagram of a method of the present invention using an oxygen pre-treatment step.

Methods for producing structural materials from lumber are provided. The methods use an oxygen ($O_2$) pre-treatment or a carbonate pre-treatment followed by densification to produce structural materials with strong mechanical properties. The pre-treatments are able to process lumber without significantly adversely affecting the mechanical properties of the densified wood made therefrom.

The methods are scalable, sustainable, and cost-effective. Moreover, the pre-treatments used in the methods have synergies for use in conjunction with wood pulping facilities. For example, the spent liquor from the oxygen pretreatment can be fed into a commercial wood pulp mill chemical recovery process, while aqueous carbonate solutions generated as spent liquors in a wood pulp mill can be used in the carbonate pre-treatment.

The starting material for the methods described herein is lumber, such as wood boards, slabs, and panels. The term lumber refers to the wood of a tree or log that has been cut into a rectangular or square shape. Thus, a piece of lumber is a unitary piece of wood that has a regular shape characterized by a length, a width, and a thickness. (The thickness dimensions may also be referred to as the radial dimension.) As such, lumber is distinguishable from smaller irregularly shaped biomass, such as wood chips or wood fibers, and from wood-based composites that are composed of smaller irregularly shaped biomass, such as wood chips or wood fibers. The use of lumber as a starting material is advantageous because lumber produces a unitary densified product with a rectangular or square prism shape that can easily be used as a structural material, such as a panel. Depending upon the thickness dimension of the lumber, it may be called a wood board, a wood block, or a wood veneer. The wood from which the lumber is cut may be, but need not be, debarked prior to or after cutting. The thickness of the lumber is typically in the range from 1 mm to 100 mm, including in the range from 3 mm to 50 mm. However, lumber having a thickness outside of these dimensions can be used. The length and width dimensions of the lumber are not particularly limited. For purposes of illustration only, a piece of lumber may have a length in the range from 100 cm to 1000 cm and/or a width in the range from 100 mm to 500 mm. In some embodiments, the lumber has a thickness dimension of at least 10 mm, a width dimension of at least 100 mm, and a length dimension of at least 100 cm.

The wood from which the lumber is cut can be a softwood or hardwood. Examples of the types of lumber that can be processed into structural materials using the methods described herein include lumber from poplar trees, lumber from basswood trees, lumber from *paulownia* trees, lumber from pine trees, or lumber from Douglas-fir or spruce trees.

The structural materials made using the methods can be used as alternatives to metals and other materials. Applications in which the structural materials can be used include as panels in automobiles (e.g., cars, trucks, vans, and the like), aircraft panels (e.g., airplane panels, jet panels, and the like), panels and/or cross-laminated timbers (CLTs) and glued laminated timbers (glulams) for buildings, and in furniture. Particular examples include use as roof panels, ceiling panels, floor panels, wall panels, glulams, automobile body panels, or panels in a cabinet. Optionally, the structural materials may be stained or painted to render them aesthetically pleasing and/or weather resistant. The structural materials may be used as formed or may be cut into shapes for a selected application.

Without intending to be bound to any particular theory of the inventions described herein, the ability of the present methods to produce mechanically strong structural materials may be attributed to a small mass loss due to a combination of delignification and dissolution of hemicelluloses by the chemical pre-treatments that is sufficient to significantly improve wood mechanical properties with post-treatment densification that substantially increased hydrogen bonding among carbohydrate chain molecules and density. Because the present methods do not completely separate wood fibers or deconstruct wood cells, but preserve the wood's hierarchical structure, mechanical integrity, and therefore substantially improve wood strength, the methods are distinguishable methods used to treat a wood biomass in a pulping process or methods that prepare wood biomass for further processing, such as pre-treatment and densifying wood chips in a pre-processing depo to reducing cost for transportation to a central location for the production of biofuels.

In some embodiments of the methods, lumber is pre-treated using oxygen ($O_2$) delignification. In these embodiments, lumber is impregnated with an aqueous solution containing a dissolved base or ammonia to render the subsequent $O_2$ delignification process more efficient. The impregnated lumber is then subjected to oxidation by dissolved oxygen that is absorbed to lignin active sites and can form hydroperoxide to partially delignify the lumber. Following this pre-treatment, the lumber is subjected to thermal densification. An embodiment of such a method is shown schematically in FIG. 1.

The lumber may be impregnated with the aqueous solution by, for example, immersing the lumber in the aqueous solution or passing the aqueous solution over the lumber for a time sufficient for the solution to infiltrate the porous structure of the wood. The impregnation can be carried out at or near room temperatures (e.g., temperatures in the range from about 21° C. to 25° C.) for a period of time in the range from 12 hours to 48 hours. However, higher or lower temperatures and/or shorter or longer times can be used. The temperature is desirably below 80° C. to avoid the onset of delignification.

For the aqueous solution, suitable chemicals include inorganic hydroxides, such as sodium hydroxide, calcium hydroxide, or potassium hydroxide, and also include ammonia and urea. A mixture of two or more chemicals may be used. The concentration of the chemicals in the aqueous solution may be in the range of 2 g/L to 100 g/L, including in the range from 10 g/L to 60 g/L, and further including in the range from 15 g/L to 40 g/L. However, the optimal concentration will generally depend upon the type of wood, the dimensions of the lumber, and/or the particular chemical being used. Thus, the concentration ranges recited here are for illustrative purposes only and concentrations outside of these ranges may be used.

Optionally, magnesium sulfate ($MgSO_4$) can be added to the aqueous solution. The magnesium sulfate reduces cellulose degradation in order to help retain the mechanical properties of wood in the final structural material product. Typical concentrations of magnesium sulfate in the aqueous solution include those in the range from 1 g/L to 8 g/L, including the range from 3 g/L to 6 g/L. However, concentrations outside of this range can be used.

The chemically impregnated lumber is then pre-heated to a desired pre-treatment temperature in a pressurized vessel. The pre-heating may be accomplished by exposing the impregnated lumber to steam or by other means, such as radiation with infrared or microwave radiation. The pre-treatment temperature is typically below 120° C. Pre-heating generally can be carried out in a short period of time, for example, a period of 10 minutes or less. Following pre-heating the lumber is exposed to an oxygen-rich environment in the pressurized vessel. During this step, the lumber is exposed to oxygen at an elevated oxygen pressure. Under these conditions, the oxygen partially delignifies the lumber. As used herein, the phrase oxygen-rich environment refers to an environment having an oxygen partial pressure greater than that of ambient air. An oxygen-rich environment is achieved by injecting oxygen ($O_2$) into the pressurized vessel. Suitable oxygen partial pressures include, but are not limited to, those in the range from 0.25 MPa to 1.25 MPa, including oxygen partial pressures in the range from 0.5 MPa to 0.75 MPa.

As used here, the phrase pre-treatment temperature refers to the temperature of the lumber within the pressurized vessel. The pre-treatment temperature at which the $O_2$ delignification is carried out (also referred to as the delignification temperature) includes temperatures of 60° C. or higher, 80° C. or higher, 90° C. or higher, and 100° C. or higher. For example, temperatures in the range from 60° C. to 120° C., including temperatures in the range from 80° C. to 110° C. can be used.

The oxygen delignification can be completed in a short timeframe. For example, the oxygen delignification can be carried out for a period of a half hour or less. By way of illustration, periods of 20 minutes to 150 minutes, including periods of 10 minutes to 30 minutes, are generally suitable. However, longer periods can be used. The pretreatment temperature can be maintained during the oxygen delignification step.

During the oxygen pre-treatment, lignin and hemicellulose are preferentially degraded, relative to the extent of cellulose degradation. The extent of delignification and hemicellulose dissolution can be measured in terms of the post-$O_2$ delignification solids yield of the lumber. In various embodiments of the methods, the post-$O_2$ delignification solids yield of the lumber is in the range from about 50% to 90%, where the solids yield is measured in accordance with the procedures described below in the Examples. This includes methods that produce lumber with a post-$O_2$ delignification solids yield in the range from 55% to 85%.

The $O_2$-delignification pre-treatment is an environmentally-friendly and sustainable chemical process due to its minimal environmental impact. The spent liquor from the $O_2$-delignification pre-treatment can be directly fed into a commercial pulp mill chemical recovery process. When $Ca(OH)_2$ is used as the base in the aqueous solution, the alkali residue can protect the wood from environmental degradation. When KOH, ammonia and/or urea are used as the base in the aqueous solution, the spent process liquor that contains lignin and a small amount of potassium can be directly used as a fertilizer, without the need for chemical recovery.

In another embodiment of the method, lumber is pre-treated using a carbonate delignification. In this embodiment, lumber is subjected to hydrolysis using an alkali carbonate, such as sodium carbonate ($Na_2CO_3$), in a pressurized vessel at an elevated temperature. To carry out the hydrolysis, the lumber and an aqueous solution containing a dissolved carbonate salt are introduced into the vessel, and the contents of the vessel are then heated to an elevated temperature. Under these conditions, the carbonate reacts with hemicelluloses and lignin in the lumber to partially delignify the lumber. Following this pre-treatment, the lumber is subjected to thermal densification. An embodiment of such a method is shown schematically in FIG. 2.

The phrase elevated temperature, as used here, refers to a temperature near the boiling point of water at the pressure within the pressurized vessel. The elevated temperature at which the carbonate delignification is carried out (referred to as the delignification temperature) includes temperatures of 90° C. or higher, 100° C. or higher, 110° C. or higher, and 120° C. or higher, depending upon the pressure within the pressurized vessel. For example, temperatures in the range from 100° C. to 200° C., including temperatures in the range from 100° C. to 180° C., can be used. The time period required for the partial delignification will vary depending upon the type of wood, the lumber dimensions, the temperature, and/or the concentration of the carbonate in the aqueous alkaline solution. However, generally, time periods in the range from 1 hour to ten hours are sufficient. Higher or lower temperatures and/or shorter or longer times can be used.

The concentration of the alkali carbonate salt in the aqueous alkaline solution can be measured in terms of alkali charge, where the alkali charge is a measure of the weight of the alkali used to treat the lumber divided by the mass of the lumber. In the carbonate pre-treatment step, an alkali charge (as $Na_2O$) in the range from 5% (i.e., 5 g of alkali, as $Na_2O$, for 100 g of lumber) to 20%, including a range from 10% to 15%, is typically suitable. However, the optimal concentration will generally depend upon the type of wood, the dimensions of the lumber, and/or the particular base being used. Thus, the alkali charge ranges recited here are for illustrative purposes and charges outside of these ranges may be used.

During the carbonate pre-treatment, lignin and hemicelluloses are preferentially degraded, relative to the extent of cellulose degradation. The extent of delignification and hemicellulose dissolution can be measured in terms of the post-carbonate delignification solids yield of the lumber. In various embodiments of the methods, the solids yield of the lumber is in the range from about 50% to 90%, where the solids yield is measured in accordance with the procedures described below in the Example. This includes methods that produce lumber with a post-carbonate delignification solids yield in the range from 60% to 90%.

The aqueous alkaline solutions may be free of sulfides. However, in some embodiments, the aqueous alkaline solutions include sulfides. This is the case when a spent liquor from a commercial kraft wood pulping process is used in the carbonate pre-treatment because carbonate is a major component in commercial pulp mill process liquors. The ability to use such spent liquors in the pre-treatment step is advantageous because it reduces costs and enables the carbonate pre-treatment to be integrated into a pulping process at a pulp mill.

Pulping liquors containing carbonates, such as sodium carbonate, include black liquor and green liquor or a mixture thereof. In addition to the alkali carbonate, green and black liquors also include hydroxide and sulfide (e.g., sodium sulfide and/or iron sulfide). Black liquor is the spent liquor resulting from the digestion of wood to remove lignin and hemicelluloses during an alkaline wood pulping process, such as Kraft pulping. As a result, black liquor also contains lignin and hemicelluloses and/or the degradation products thereof. Sodium carbonate typically makes up about 40% of the alkali in black liquor, with a typical $Na_2CO_3$ concentration of approximately 1.5%. However, the alkali content in black liquor can vary from these concentrations.

Green liquor is the liquor resulting from the dissolution of the smelt from the combustion of pulping spent liquor (black liquor). Green liquor is named for its greenish color, which results from iron sulfide present in the solution. Sodium carbonate typically makes up about 60% of the alkali in the green liquor from a kraft pulp mill, with a typical $Na_2CO_3$ concentration of approximately 18%. However, the alkali content in green liquor can vary from these concentrations.

Both green and black liquor are readily available in commercial pulp mills at minimal cost. Using side streams of pulp mill black or green liquor, or mixtures of green and black liquor, with or without white liquor (i.e., fresh liquor for pulping containing primarily $Na_0H$), is a very cost-effective and scalable approach. Furthermore, the spent liquor from the lumber pre-treatment steps can simply be cycled back to the pulp mill chemical recovery system, eliminating additional environmental impacts and the need for an expansive and independent chemical recovery process, leading to a sustainable process.

The $O_2$ and carbonate pre-treatment conditions, including temperatures, times, and base or alkaline carbonate concentrations, can be tailored to produce pre-treated lumber having a low cellulose degradation, where cellulose degradation can be measured as the percent cellulose loss, as described in the Examples. For example, the pre-treatments may produce pre-treated lumber having a cellulose dissolution of 25% or less, 20% or less, 15% or less, 10% or less, or 5% or less, based on mass. By way of illustration, a cellulose dissolution in the range from 0% to 15% is desirable.

The $O_2$ and carbonate pre-treatments described herein partially, but not completely, delignify the lumber. The extent of delignification can be determined by Klason lignin loss, based on mass. Methods of measuring Klason lignin loss are described in the Example. Generally, a delignification of at least 15% and more preferable at least 25% is desirable. By way of illustration only, the extent of lumber delignification by the pre-treatment step, based on Klason lignin, may be in the range from 15% to 50%, based on mass.

The oxygen pre-treatment or carbonate pre-treatment is followed by a thermal compression to densify the lumber and convert it into a structural material. To densify the pre-treated lumber, the lumber is compressed at an elevated temperature for a time sufficient to reduce the thickness and density of the lumber to render it suitable for use as a structural material. A press, such as a hydraulic press with a heated platen with or without steam, may be used to compress one or more pieces of the lumber. The thermal compression may be carried out on the pre-treated lumber in its wet state or after at least partial drying of the pre-treated lumber. In particular, thermal pressing after an $O_2$ or carbonate pre-treatment may cause wood fracture due to steam explosion. So, it is preferable to dry lumber that has been pre-treated using the oxygen or carbonate pre-treatment to a moisture content of about 10% by mass. Generally, it is preferable to press the pre-treated lumber at a temperature above the lignin glass transition temperature, so lignin will flow to facilitate wood cell collapsing, the so called viscoelastic thermal compression. (VTC, Kamke & Sizemore, 2008, U.S. Pat. No. 7,404,422; application Ser. No. 10/771,511 (2004).) Typically, the lignin glass transition temperature is higher at a low moisture content.

The increased density of the lumber can be measured by the density ratio, which is the ratio of the density of the densified lumber over the density of the original lumber. Generally, the densification step will produce a densified lumber structural material with a density ratio of 1.2 or higher, 1.4 or higher, 1.6 or higher, 1.8 or higher, or 2.0 or higher. For example, the density ratio of the final structural material may be in range from 1.2 to 3.0. However, the structural materials may have a density ratio outside of this range, and the density ratio may be tailored to render the structural material suitable for a particular intended application.

The decreased thickness of the lumber can be measured by the compression ratio, which is the percentage change in the lumber thickness, relative to its original thickness. Generally, the densification step will produce a densified lumber structural material with a compression ratio of 20% or higher, 25% or higher, 40% or higher, 50% or higher, or 60% or higher. For example, the compression ratio of the final structural material may be in range from 25% to 75%. However, the structural materials may have a compression ratio outside of this range, and the compression ratio may be tailored to render the structural material suitable for a particular intended application.

The pressure and temperature used during the thermal compression and the duration of the compression will depend on the type of wood, the dimensions of the lumber, and the desired final density and thickness of the structural material. By way of illustration only, compression temperatures in the range from about 50° C. to 200° C., including in the range from 70° C. to 190° C. and from 90° C. to 150° C. and/or compression pressures in the range from 1 MPa to 5 Mpa, are typically suitable. However, temperatures and pressures outside of these ranges may be used. Generally, the compression duration is short, lasting less than 2 hours. For example, the duration of the thermal compression may be in the range from five minutes to two hours. However, shorter or longer periods of time are also suitable.

The methods described herein produce densified lumber (structural materials) having good mechanical properties, including high bending strengths and hardness, without the need to impregnate the lumber with organic resins or polymers. The mechanical properties of the densified lumber can be measured by its modulus of rupture (MOR), modulus of elasticity (MOE), and Brinell hardness ($H_B$). Methods for measuring these properties are described in the Examples. For example, after $O_2$ or carbonate pre-treatment and densification, a piece of structural material may have an MOR that is at least 10% higher, at least 25% higher, at least 50% higher, at least 100% higher, or at least 200% higher than the MOR of the lumber from which it was made. Similarly, after $O_2$ or carbonate pre-treatment and densification, a piece of structural material may have an MOE that is at least 40% higher, at least 50% higher, at least 100% higher, at least 200% higher, or at least 300% higher than the MOE of the lumber from which it was made. After $O_2$ or carbonate pre-treatment and densification, a piece of structural material may have a Brinell hardness that is at least 30% higher, at least 50% higher, at least 100% higher, at least 200% higher, or at least 300% higher than the Brinell hardness of the lumber from which it was made.

After densification, the structural materials may be conditioned in a climate-controlled chamber at or near room temperature (e.g., 20° C. to 25° C.) and at an elevated relative humidity of 50% or higher, e.g., 60% or higher for a period of a day or longer, including a week or longer. By way of illustration, conditioning can be carried out at a relative humidity of 65% for two weeks.

EXAMPLES

Figure 2:
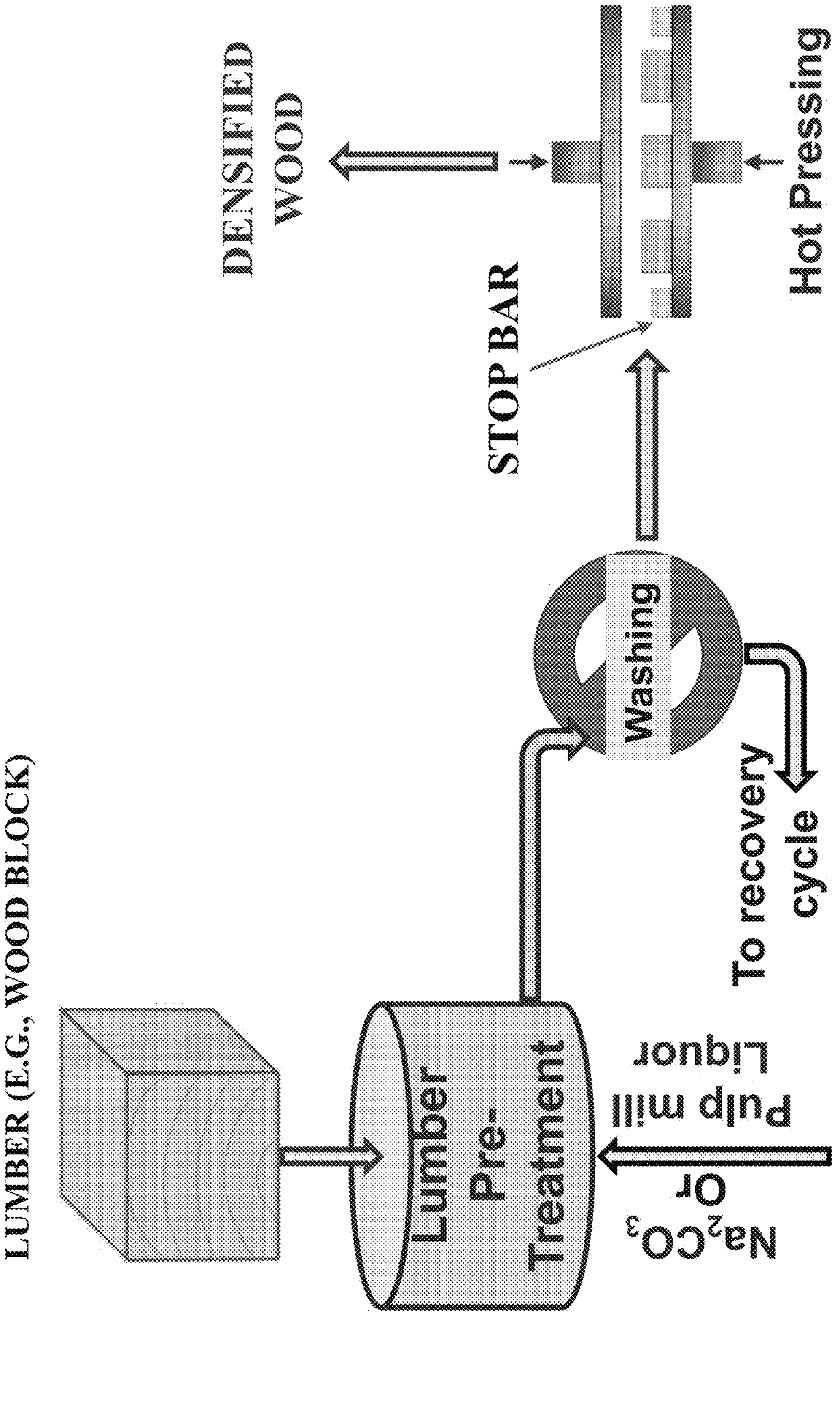
FIG. 2. A schematic flow diagram of a method of the present invention using a carbonate pre-treatment step.

The examples presented here were carried out according to the schematic flow diagrams shown in FIG. 1 and FIG. 2.

Materials Used

Poplar wood (*Populus deltoides* Bartr. ex Marsh×*P. nigra* L.) was harvested from Hugo Sauer Nursery, USDA Forest Service, Northern Research Station, Rhinelander, Wisconsin, in December 2018. The logs were hand peeled to remove bark. Wood block samples of 100 mm (longitudinal) by 10 mm (radial) by 20 mm (tangential) were cut from the fresh wood logs. Wood materials within a radius of 10 mm from the center of each wood log were discarded and not used to eliminate the effect of juvenile wood on wood block mechanical properties.

A basswood veneer panel of 3.2 mm in thickness was cut to make 7 veneer boards of 20.3×14.0 cm (8"×5½"). One thick basswood board of 45.1×17.1×2.2 cm (17¾"×6¾"×⅞"), and two thick basswood boards of 45.2×12.4×2.2 cm (17.8"×4.9"×⅞"), were cut from commercial-sourced basswood boards supplied by Inventwood, LLC (College Park, MD, USA).

Sodium carbonate ($Na_2CO_3$) along with calcium and sodium hydroxide of ACS reagent grade were purchased from Sigma-Aldrich (St. Louis, MO). Compressed oxygen bottles were supplied by Badger Welding Supply, Madison, WI.

Example 1: Wood Treatment Using Aqueous $Na_2CO_3$ Solution

Poplar wood block samples were dried first to constant weight at 103±2° C. before undergoing hydrothermal and chemical treatment using $Na_2CO_3$. Sulfide free sodium carbonate solutions of concentration 0, 60.4, 93.5 g/L were prepared by dissolving appropriate amounts of $Na_2CO_3$ in water. These $Na_2CO_3$ concentrations were selected based on total alkali charge, as $Na_2O$, on wood of 0, 10%, and 15%, respectively. A sulfide containing sodium carbonate solution with $Na_2S$ and $Na_2CO_3$ concentrations of 6.5 and 20.8 g/L, equivalent to total alkali (as $Na_2O$) and sulfidity of 5% and 30%, respectively, was also prepared to simulate kraft pulping spent liquor (black liquor). Wood samples were treated at 155° C. for 30 min using the prepared carbonate solutions at a liquor-to-wood ratio L/W=3:1 in a 1-L bomb reactor placed in a 21-L rotating wood pulping digester heated by a steam jacket, as described previously. (Tian et al., 2011. *Biotechnol. Prog.*, 27(2), 419-427.) These treatment runs were denoted as G0 (strictly hydrothermal treatment with no $Na_2CO_3$), G10, G15, and B5 (with sulfide). The detailed treatment conditions are listed in Table 1. After treatment, the samples were washed using tap water several times. The chemical compositions of the treated wood were analyzed.

TABLE 1

List of wood chemical treatment and densification conditions.

| Samples [1] | Treatment at 155° C. for 30 min with chemical loading (g/L) $Na_2CO_3$ | $Na_2S$ | Densification at 150° C. for 15 min Stop bar | P (MPa) | Densified wood thickness (mm) [2] |
|---|---|---|---|---|---|
| Pristine poplar wood | | | | | 10.0 |
| G0PN | 0 | 0 | N | 1 | 5.0 |
| G10PN | 60.4 | 0 | N | 1 | 4.8 |
| G15PN | 93.5 | 0 | N | 1 | 4.1 |
| G15P3N | 93.5 | 0 | N | 3 | 3.7 |
| G15P5N | 93.5 | 0 | N | 5 | 3.2 |
| G10P | 60.4 | 0 | Yes | 1 | 7.1 |
| B5P | 20.8 | 6.5 | Yes | 1 | 7.3 |

[1] PN, P3N, and P5N stand for pressing without stop bars at 1, 3, 5 MPa, respectively.
[2] After conditioning

Example 2: Wood Treatment Using Oxygen Delignification

Six basswood veneer pieces were soaked in a 50 g/L NaOH aqueous solution for 24 h at room temperature. One basswood veneer piece was soaked in a saturated aqueous $Ca(OH)_2$ solution for several weeks at room temperature. The three basswood boards were soaked in a 30 g/L aqueous NaOH solution for 36 h at room temperature. After impregnation, each wood specimen was removed from the alkaline solution, allowed to drain free liquor, and wiped with paper. The vertical 21 L wood pulping digester was pre-heated to 100° C. using the vessel's steam jacket. The wood specimens were then loaded into the reactor, after which steam was directly injected into the interior of the reactor, bringing the internal temperature to 110° C. Oxygen was then injected to pressurize the vessel to 6.2 bar (90 psig). The wood specimens were then held at 110° C. for 60 minutes using primarily jacket steam heat along with several short bursts of direct steam injection during the first 5 minutes of the treatment. At the end of reaction, 693 g of condensate, at pH 12.2 and arising from direct steam injection, was collected. The wet wood specimens were weighed. Mass gains and losses of the wood specimens through impregnation and $O_2$-delignification were recorded and are shown in Table 2.

TABLE 2

A list of wood weight before and after soaking, and after $O_2$-delig of all the wood samples tested.

| Wood board [1] | Weight (g) [2] | Post-soaking weight (g) | Pre-soaking dimension Thickness (mm) | Width (mm) | Length (cm) | Alkali absorbed (g/kg wood) [2] | Post-$O_2$-delig wet weight (g) | $O_2$-delig solids yield (%) [2] |
|---|---|---|---|---|---|---|---|---|
| V1-Na | 37.5 | 104.9 | 3.12 | 203.2 | 147.6 | 97.3 | 106.2 | 58.7 |
| V2-Na | 40.3 | 112.8 | 3.15 | 203.2 | 138.1 | 97.3 | 108.7 | 58.7 |
| V3-Na | 47.1 | 131.9 | 3.23 | 203.2 | 138.1 | 97.3 | 110.3 | 58.7 |
| V4-Na | 41.6 | 116.5 | 3.12 | 204.0 | 147.6 | 97.3 | 115.6 | 58.7 |
| V5-Na | 43.6 | 122.2 | 3.20 | 203.2 | 147.6 | 97.3 | 114.5 | 56.6 |
| V6-Na | 40.0 | 112.1 | 3.15 | 204.0 | 146.8 | 97.3 | 110.0 | 60.8 |
| V7-Ca | 41.7 | 116.7 | 3.16 | 204.0 | 144.3 | 3.4 | 110.9 | 83.3 |
| Bl-Na | 841 | 2251 | 22.2 | 171.5 | 450.9 | 54.6 | 1953 | 73.8 |
| Bs-Na | 585 | 1611 | 22.2 | 123.8 | 452.4 | 57.0 | 1404 | 73.8 |

[1] Vn-Na stands for basswood veneer impregnated either by NaOH (Na) or $Ca(OH)_2$ (Ca); Bl-Na and Bs-Na stands for the large and small basswood boards, respectively. The data for the Bs-Na were averages of the two small basswood boards.

[2] Air dry weight, moisture content of all wood samples was assumed at 5% in yield calculations.

The hydrothermal treatment had the lowest removal rate and thus the highest solids yield of 95%. Lignin and hemicellulose dissolutions ranged from approximately 18% to 41% and 12% to 23%, respectively, for the runs with carbonate. Results clearly show that carbonate treatment had negligible cellulose loss and/or protected cellulose better than NaOH treatment under the same treatment temperature and time reported in literature. (Wang et al., 2020.) This is critically important for the resultant wood mechanical strength.

Example 3: Wood Component Mass Losses by Carbonate Treatment

Chemical compositions of wood samples were determined by the Analytical Chemistry and Microscopy Laboratory at the USDA Forest Products Laboratory, Madison, WI, USA, using conventional two-step acid hydrolysis, as described previously. (Luo et al., 2010. *Ind. Eng. Chem. Res.,* 49(17), 8258-8266) In brief, the carbohydrates in wood samples were hydrolyzed into monomeric sugars in two steps using sulfuric acid and then analyzed for sugars by ion chromatography (ICS-5000, Dionex) with amperometric detection (HPAEC-PAD). The insolubilized materials were measured gravimetrically. The insolubilized materials were then combusted at 560° C. for 3 h to gravimetrically determine the ash content. The difference between the amounts of ash and the insoluble solids is considered as Klason lignin. The chemical composition of the treated wood along with wood component mass losses are listed in Table 3. Wood solids yields varied with carbonate loading and were greater than 85% for all the treatments performed.

TABLE 3

Solid yield and chemical compositions of treated poplar wood along with wood component mass yields (numbers in the parentheses).

| Groups | Solids yield (%) | Ash (%) | Klason Lignin (%) | Cellulose (%) | Xylan (%) |
|---|---|---|---|---|---|
| Pristine poplar | 100 | 0.1 | 23.6 (100) | 48.4 (100) | 18.4 (100) |
| G0 | 95.2 | 0.1 | 25.0 (100.8) | 50.3 (106.1) | 17.9 (92.4) |
| G10 | 89.0 | 0.0 | 19.6 (74.0) | 53.3 (105.0) | 17.5 (84.3) |
| G15 | 86.5 | 0.0 | 16.1 (59.1) | 56.3 (107.7) | 16.5 (77.4) |
| B5 | 93.6 | 0.0 | 20.7 (82.1) | 52.5 (101.3) | 17.4 (88.5) |

Example 4: Wood Component Mass Losses by $O_2$-Delig

Similarly, the chemical composition of pristine wood and $O_2$-delig wood were analyzed. Component mass yields were calculated. As listed in Table 4, $O_2$-delig with $Ca(OH)_2$ preserved more wood than using $Na(OH)_2$ in terms of solid yield and component mass yields by comparing the results from basswood veneers. The data for basswood specimens treated with NaOH were averaged of all boards listed in Table 4. The solid and lignin yields from the basswood boards were higher than those from the basswood veneers, perhaps due to the greater thickness of the basswood boards relative to the veneers and the lower alkali loading on boards of 30 g/L NaOH.

TABLE 4

Solid yield and chemical compositions of $O_2$-delig basswood veneer and thick basswood boards along with wood component mass yields (numbers in the parentheses).

| Groups | Solids yield (%) | Klason Lignin (%) | Cellulose (%) | Xylan (%) |
|---|---|---|---|---|
| Pristine poplar veneer | 100 | 20.8 ± 1.2 (100) | 42.6 ± 0.2 (100) | 13.0 ± 0.9 (100) |
| V-Na | 58.7 | 19.5 ± 0.6 (55.5) | 59.3 ± 2.9 (75.9) | 7.7 ± 0.3 (34.9) |
| V-Ca | 83.3 | 19.8 ± 0.8 (79.5) | 55.1 ± 1.2 (88.7) | 11.1 ± 0.1 (71.5) |
| Pristine basswood board | 100 | 18.7 ± 1.5 (100) | 44.6 ± 3.0 (100) | 15.1 ± 1.1 (100) |
| B-Na | 73.8 | 18.4 ± 0.8 (72.9) | 50.4 ± 0.7 (84.0) | 11.7 ± 0.9 (57.1) |

Example 5: Wood Densification and Characterization

The treated poplar wood samples were densified in the wood radial direction right after treatment while they were wet. As listed in Table 1, wood samples were compressed (FIG. 1) using a heated-platen 12"×12" hydraulic press (Carver model) from an initial thickness of 10 mm at a pressure of 1.0 MPa for 15 min at 150° C. without stop bars. Additionally, G15 wood samples were pressed without stop bars at either 3 or 5 MPa. Further, G10 and B5 samples were pressed using two 8-mm-thick stop bars. These densified wood samples were labeled according to their treatment and pressing conditions as listed in Table 1. After densification, the wood samples were conditioned in a climate-controlled chamber at 20° C. and a relative humidity of 65% for two weeks.

Wood optical appearance was measured according to the International Commission on Illumination (CIE) L*a*b* color coordinates. Surface color spectra were measured with a spectrocolorimeter (CR-400, MINLTA, Japan). At least five random measurements were taken for each sample to calculate the mean and standard deviation. From the measured L*a*b* values, the total color difference (ΔE) from the untreated wood was calculated using the root of the sum of the square of the component differences between the sample and the untreated wood as follows:

$$\Delta E=\sqrt{(\Delta L^*)^2+(\Delta a^*)^2+(\Delta b^*)^2} \quad (1)$$

Each wood sample was weighed before and after densification and conditioning. Mass loss (ML) by wood treatment and densification was determined as $$ML = \frac{m_0 - m_1}{m_0}(\%) \quad (2)$$

where $m_0$ is the initial mass of the oven-dried sample before delignification and $m_1$ is the mass of the same sample after densification and oven drying. It should be noted that ML was measured after densification while solids yields in Table 3 were measured right after wood treatment before densification.

The compression ratios (CRs) immediately after densification $CR_1$ and after conditioning $CR_2$ are defined as the percentages of change in wood sample thickness from its original sample thickness t:

$$CR_N = \frac{t_0 - t_N}{t_0}(\%) \quad (3)$$

where $t_0$ and $t_N$ are thicknesses of the initial and densified or densified and conditioned wood samples, with N=1 immediately after densification and N=2 after conditioning. A parameter to characterize wood sample rebound set-recovery (SR) or shrinkage (negative value) after conditioning can be expressed as $$SR = \frac{t_2 - t_1}{t_1}(\%) \quad (4)$$

Density (φ of the samples was calculated after conditioning in a climatic chamber (20° C., 65% RH) until there were no changes in weight. The densification ratio was defined as the density ratio of the densified wood over the original wood, i.e., $$\rho' = \frac{\rho_1}{\rho_0}(\%) \quad (5)$$

Modulus of rupture (MOR) and modulus of elasticity (MOE) were measured by three-point static bending tests using a modified standard procedure described in ASTM D4761-19 (ASTM, 2019) on specimens with dimensions of approximately 100 mm (longitudinal) by 20 mm (tangential) by 8 mm (radial) with a span of 89 mm and a crosshead speed of 5 mm/min using a universal mechanical testing machine (Instron 5869, Grove, PA, USA). Mean and standard deviations of MOR and MOE were calculated from testing results of 10 replicate samples for each set of wood samples as $$MOR = \frac{3 \times F_{max} \times l}{2 \times b \times t^2} \quad (6)$$

$$MOE = \frac{l^3}{4 \times b \times t^3}K \quad (7)$$

where $F_{max}$ is the peak load, l is the span of supports, b is the width of the sample, t is the thickness of the sample, and K is the slope of the load vs deflection curve between 20% and 40% of the maximum load obtained from linear regression.

Wood hardness was characterized by the Brinell hardness test using European Standard EN 1534 (European-Standard, 2020) with minor modifications, similar to that carried out in the literature. (Fang et al., 2012; Gong et al., 2010. *Journal of Materials Processing Technology,* 210(2), 293-296.) Specimens with dimensions of 20 mm (longitudinal) by 20 mm (tangential) by 8 mm (radial) were tested using a universal mechanical testing machine (Instron 5896, Grove, PA, USA) with a ball diameter of D=3.18 mm. During testing, the ball was penetrated to a depth h=1.60 mm. At least six replicate samples were tested for each set to calculate mean and standard deviation. The Brinell hardness ($H_B$) in $N/mm^2$ was calculated as $$H_B = \frac{F}{\pi \times D \times h} \tag{8}$$

where F is applied load, D is diameter of the indenter ball, and h=1.6 mm is the measured depth of the indentation at the applied load.

Images of cross sections of the control and densified wood samples were observed using a stereo scope (M205 C, Leica, Wetzlar, Germany) equipped with a camera (FL3-U3-120S3C, FLIR System, Wilsonville, OR, USA) under 80 times magnification. The images were analyzed using Image J software (NIH, Bethesda, MD, USA).

Example 6: Compression Ratio and Density of Carbonate Treated Poplar Wood Blocks The ML, measured CR, and $\acute{\rho}$ of the samples are presented in Table 5. MLs of densified wood are very similar to the losses through wood treatment reported in Table 3, because mass loss through densification is negligible.

TABLE 5

Average values and standard deviations of mass loss, compression ratio, density, and porosity of poplar samples treated by carbonate.

| Groups | Mass loss (%) | $CR_1$ (%) | $CR_2$ (%) | $SR_1$ (%) | $\vec{\rho}$ | ρ ($g/cm^3$) |
|---|---|---|---|---|---|---|
| Untreated | — | — | — | — | 1.00 | 0.463 ± 0.019 |
| G0PN | 5.2 ± 0.5 | 52.2 ± 2.3 | 50.0 ± 2.4 | 4.8 ± 0.6 | 1.65 | 0.765 ± 0.097 |
| G10PN | 11.1 ± 1.4 | 54.5 ± 0.2 | 51.8 ± 0.4 | 6.0 ± 0.7 | 1.64 | 0.761 ± 0.033 |
| G15PN | 13.6 ± 2.8 | 61.7 ± 0.3 | 59.2 ± 0.3 | 6.5 ± 0.7 | 1.88 | 0.870 ± 0.072 |
| G15P3N | 11.5 ± 1.9 | 63.8 ± 0.9 | 63.3 ± 0.8 | 1.5 ± 0.8 | 1.92 | 0.891 ± 0.049 |
| G15P5N | 10.2 ± 0.5 | 67.8 ± 3.5 | 68.0 ± 3.6 | −0.7 ± 1.1 | 2.05 | 0.953 ± 0.039 |
| G10P | 13.4 ± 1.1 | 26.6 ± 1.3 | 29.2 ± 0.8 | −3.6 ± 1.2 | 1.18 | 0.535 ± 0.021 |
| B5P | 9.7 ± 0.6 | 26.1 ± 3.7 | 27.1 ± 3.1 | −1.4 ± 0.9 | 1.24 | 0.572 ± 0.031 |

The CRs for wood samples pressed without the two stop bars were 50-70%, depending on wood treatment mass loss and pressing pressure. For pressing at 1 MPa, the maximum CR was approximately 60% from the run G15. CRs were around 26% for the two samples pressed with stop bars of 8 mm in height during densification at 1 MPa. The compression ratios $CR_1$ and $CR_2$ before and after conditioning were approximately the same for all samples.

SR was used to measure potential of set recovery or shrinkage of wood samples after conditioning. For the samples pressed without stop bars, a 1 MPa pressing pressure resulted in a SR of 6%, higher than the SRs for the two samples pressed at elevated pressures of 3 and 5 MPa. Pressing with stop bars resulted in negligible set recovery after conditioning, perhaps due to the low extent of densification.

Hot-pressing reduced the thickness of wood samples and increased sample density when comparing with the density of the control (untreated and unpressed) wood of 0.463 $g/cm^3$. Pressing without stop bars increased wood density by 65-88% depending on wood treatment mass removal. A higher mass loss increased or facilitated wood densification. Density was increased to 165% for the wood treated under G15 and pressed under 5 MPa. Density increase was approximately 20% for the two wood samples pressed with stop bars, slightly lower than those reported previously using NaOH treatment. (Wang et al., 2020.) The results indicate that any effect of a low mass loss using carbonate treatment can be well compensated by removing stop bars or using at slightly higher pressure in pressing.

Example 7: Physical and Mechanical Properties of Densified Poplar Wood Blocks

As listed in Table 6, wood treatment reduced lightness L*. However, among the carbonate treatment runs, L* variation was insignificant. However, pressing pressure had a strong effect on lightness due to the concentration of color from the formation of chromophores in lignin in the samples. (Shi et al., 2018. *Scientific Reports,* 8(1); Wang et al., 2019. *ACS Sustainable Chem. Eng.,* 7, 10808-10820.) The untreated wood had a very low a* value of 3.6 as natural polar wood has a creamy color; hydrothermal treatment increased a*=8.3. Carbonate treatment further increased a* to approximately 10. Densification at high pressure slightly reduced a*. There were no noticeable differences in b* value because the tonality component in color and the value of color saturation varied slightly among all samples. (Bekhta et al., 2014. *European Journal of Wood and Wood Products,* 72(6), 785-797.)

TABLE 6

Treated wood surface color measurements in comparison with untreated poplar wood.

| Groups | L* | a* | b* | ΔL* | Δa* | Δb* | ΔE |
|---|---|---|---|---|---|---|---|
| Untreated poplar | 83.5 | 3.6 | 20.6 | — | — | — | — |
| G0PN | 56.2 | 8.3 | 19.3 | −27.3 | 4.7 | −1.3 | 27.7 |
| G10PN | 49.8 | 10.8 | 20.6 | −33.7 | 7.3 | −0.0 | 34.4 |
| G15PN | 51.5 | 10.3 | 21.7 | −32.0 | 6.8 | 1.1 | 32.7 |
| G15P3N | 47.1 | 9.7 | 19.5 | −36.4 | 6.1 | −1.1 | 36.9 |
| G15P5N | 41.6 | 9.0 | 17.3 | −41.9 | 5.5 | −3.3 | 42.3 |
| G10P | 50.5 | 9.6 | 21.2 | −33.0 | 6.0 | 0.6 | 33.5 |
| B5P | 51.7 | 9.7 | 18.1 | −31.8 | 6.1 | −2.5 | 32.5 |

A series of bending and hardness tests were performed on the control and densified wood samples to evaluate the mechanical properties of densified wood samples. Table 7 shows that MOR, MOE, and $H_B$ were all increased by densification. Due to steam release/explosion that resulted from hot pressing of water-saturated wet wood samples at high pressures, the two sample sets pressed at 3 and 5 MPa resulted in cracks. The G15P5N samples were significantly shattered. Therefore, the data for these samples need to be discerned. Comparing G15PN with the un-densified, untreated poplar wood, MOR was almost doubled to 160 MPa, while MOE and $H_B$ were increased by over 350% to 24 GPa and 50 MPa, respectively. It is worth noting that even with defects, the $H_B$ of G15P3N was increased to 65.7 MPa when pressing pressure was increased to 3 MPa. These data are very encouraging for super strong wood floor applications. Comparing G10PN with G10P suggests pressing without stop bars further increased wood mechanical strength due to the higher wood density resulting from pressing without stop bars.

TABLE 7

Bending strength and hardness of densified wood.

| Wood samples | ρ ($g/cm^3$) | MOR (MPa) | MOE (GPa) | $H_B$ (MPa) |
|---|---|---|---|---|
| Pristine poplar | 0.463 ± 0.019 | 88.5 ± 5.1 | 6.5 ± 0.8 | 14.8 ± 2.5 |
| G0PN | 0.765 ± 0.097 | 109.8 ± 25.7 | 4.6 ± 1.2 | 27.8 ± 2.5 |
| G10PN | 0.761 ± 0.033 | 135.1 ± 16.7 | 17.0 ± 3.6 | 37.2 ± 3.9 |
| G15PN | 0.870 ± 0.072 | 159.6 ± 10.3 | 24.0 ± 2.8 | 50.4 ± 4.3 |
| G15P3N | 0.891 ± 0.049 | 140.0 ± 14.0 | 6.3 ± 0.7 | 65.7 ± 10.8 |
| G15P5N | 0.953 ± 0.039 | 100.0 ± 12.0 | 4.8 ± 0.5 | 27.3 ± 6.2 |
| G10P | 0.535 ± 0.021 | 102.3 ± 9.6 | 11.1 ± 1.2 | 19.4 ± 2.7 |
| B5P | 0.572 ± 0.031 | 114.8 ± 9.7 | 11.0 ± 1.0 | 25.0 ± 4.8 |

Figures 3A, 3B, 3C:
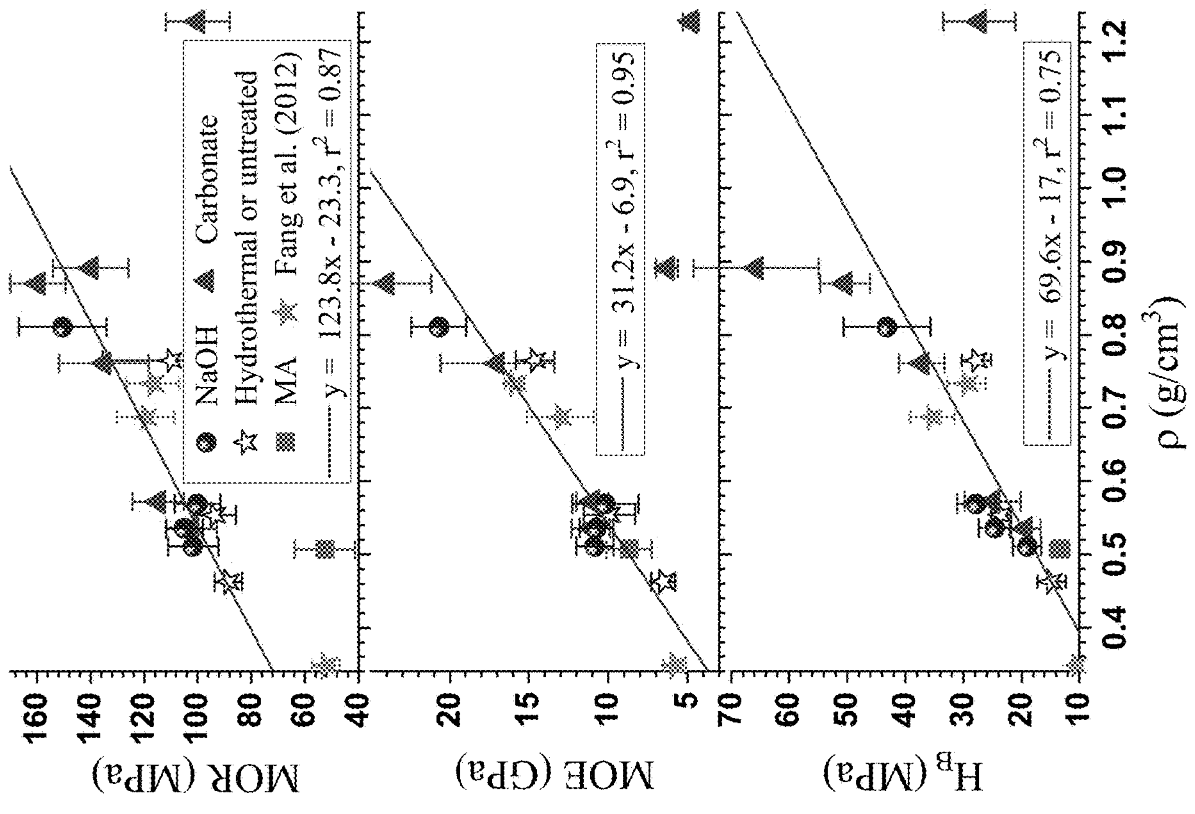
FIGS. 3A-3C. Comparisons of bending modulus of rupture (MOR), the bending modulus of elasticity (MOE), and the hardness ($H_B$) of densified wood samples made using a method that includes a carbonate pre-treatment with the MOR, MOE, and $H_B$ of densified wood samples made using thermal, hydrothermal, hydroxide, and maleic acid (MA) pre-treatments. (For the thermal data, see Fang, C. H. et al., 2012. *BioResources,* 7(1), 925-935; for MA, hydrothermal, and hydroxide data, see Wang, J. et al., 2020. *J. Mat. Sci.* 55, 14664-14676.)

To further illustrate the effectiveness of carbonate treatment, the data in Table 7 (excluding G15P5N that was shattered) were plotted along with literature data from densified wood using NaOH treatment and simple thermal densification at higher pressures. (Wang et al., 2020; Fang et al., 2012.) The thermal densification was achieved using steam (140-220° C.) injected from the press to treat wood under a pressure profile of 4.5-9 MPa for 30 min, substantially higher than pressing at a constant pressure of only 1 MPa at 150° C. for 15 min for the carbonate treated wood samples disclosed here. The data points from the thermal treatment study shown in FIGS. 3A-3C are in the order of increasing density on the x coordinate: unpressed, pressed at 160° C., and pressed at 220° C. (Fang et al., 2012.) Results clearly indicate that wood bending MOR and MOE were increased with wood density (ignoring the data points from the defective G15P3N), and independent of wood treatment method. Therefore, low environmental impact carbonate treatment is preferred to NaOH treatment. Thermal treatment has an even lower environmental impact; however, it only achieved a density of 0.73 $g/cm^3$ for wood veneers 4.3 mm thick even with much higher pressures and being steamed at 220° C. compared to the density of 0.87 $g/cm^3$ (Table 5) achieved in this disclosure with 10 mm thick samples using pressing pressure of only 1 MPa at 150° C. with 14% mass loss (Table 3). (Fang et al., 2012.) Similarly, as disclosed here, hydrothermal treatment alone only achieved a density of 0.76 $g/cm^3$ in this study under 1 MPa constant pressing for 15 min at 150° C. The data clearly show much higher density can be achieved at a low pressure of 1 MPa for carbonate treated wood samples.

Example 8: Dimensional Stability of Thermally-Treated Densified Poplar Wood Blocks To evaluate the wood dimensional stability, the pristine and densified poplar wood block samples were thermally treated. The post-densification thermal fixing treatment was conducted at 180° C. for 2 h in a 0.13 $m^3$ chamber with less than 2% oxygen content. The chamber was heated via injecting saturated steam as in previous studies. (Gao et al., 2018. *Applied Sciences,* 9(1), 78; Wang et al., 2021. *Materials,* 14(19), 5709.) After the treatment, the samples were cooled and dried, and the weight changes of the samples were recorded.

Water absorption (WA), thickness swelling (TS), and set recovery after saturation with water ($SR_w$) of densified wood samples with and without thermal fixing treatment were measured within a 20 mm×20 mm area. All wood samples were soaked in water for 16 days, measured, and subsequently oven-dried. The weight and dimensions of samples after saturation and oven-dried conditions were recorded. The WA was evaluated according to the below equation:

$$WA = \frac{m - m_0}{m_0} \times 100\% \tag{9}$$

where m is the wet weight after immersion in water for 16 days, and $m_0$ is the oven-dried weight before immersion in water.

TS was determined from thickness measurements of the samples using the equation below:

$$TS = \frac{t_{max} - t_0}{t_0} \times 100\% \tag{10}$$

where $t_{max}$ is thickness after water saturation and $t_0$ is thickness before immersion in water.

$SR_w$ was calculated as follows:

$$SR_w = \frac{t_r - t_0}{t_u - t_0} \times 100\% \tag{11}$$

where $t_r$ is the thickness of a thermally-treated densified wood block after saturation and subsequent oven drying, $t_u$ is the thickness of the corresponding untreated and undensified raw wood block, and $t_0$ is thickness before immersion in water.

Water absorption (WA), thickness swelling (TS), as well as set recovery ($SR_w$), were used to evaluate wood dimensional stability, as listed in Table 8. It appears that hydrothermal treatment which dissolved some hemicelluloses may have slightly decreased WA compared with the untreated wood. Carbonate treatments dissolved lignin and increased WA of densified wood. When comparing sample G1 OP with G10PN, pressing without stop bars resulted in a lower WA than with stop bars. The WA values listed in Table 8 for the carbonate treated wood are similar to those of unbleached wood fibers of 150% reported in literature. (Luo et al., 2011. *Cellulose,* 18, 1339-1344.)

TABLE 8

Comparisons of water absorption, radial swelling and set recovery of densified samples treated by carbonate with and without thermal fixing treatment.

| Wood samples | WA (%) | TS (%) | $SR_w$ (%) | $ML_f$ (%) | $WA_f$ (%) | $TS_f$ (%) | $SR_{wf}$ (%) |
|---|---|---|---|---|---|---|---|
| Untreated | 111.6 | 8.3 | — | | | | |
| G0N | 94.5 | 66.8 | 10.4 | 0.1 ± 0.2 | 105.3 ± 6.0 | 38.7 ± 4.4 | 10.0 ± 2.1 |
| G10N | 136.4 | 68.7 | 29.0 | 0.0 ± 0.4 | 137.0 ± 2.4 | 35.5 ± 1.9 | 13.5 ± 2.1 |
| G15N | 146.3 | 91.1 | 26.3 | 0.6 ± 0.1 | 100.5 ± 2.6 | 44.7 ± 1.2 | 6.1 ± 1.0 |
| G15P3N | 133.2 | 76.2 | 8.9 | | | | |
| G15P5N | 143.4 | 127.0 | 22.5 | | | | |
| G10P | 166.4 | 38.6 | 30.2 | 1.1 ± 0.5 | 130.0 ± 1.5 | 22.1 ± 4.0 | 15.4 ± 1.5 |

TS of densified wood samples increased with increasing mass loss through thermo-chemical treatment. Also, G10PN, pressed without stop bars with a higher compression ratio, exhibited a much higher TS compared to G1 OP with a lower compression ratio because the internal stresses introduced during hot-pressing are more easily relieved. (Song et al., 2018; Wang et al., 2020.) Furthermore, by definition of TS, G10PN with a much thinner initial thickness will result in a greater TS.

The elastic strain energy stored in semi-crystalline microfibrils and lignin of wood is the principal reason for compression set recovery. (Higashihara, 2000. *Journal of the Japan Wood Research Society,* 46(4), 291-297; Navi & Heger, 2004. *MRS Bulletin,* 29(5), 332-336.) $SR_w$ of carbonate treated wood is approximately 25%, as listed in Table 8. A person skilled in art should be able to improve densified wood thermal stability using surface coating or painting.

Thermal fixing treatment may be used to fix the dimensional stability of densified wood. (Navi & Heger, 2004.) Mass losses ($ML_f$) through thermal fixing was minimal for the four samples experimented as listed in Table 8. Thermal-fixing substantially reduced thickness swelling (ISO from approximately 50% to 70% for the samples evaluated compared with the corresponding sample without thermal fixing, even though water absorption was not as significantly decreased. Thermal fixing also significantly decreased set-recovery ($SR_{Wf}$) by approximately 50% to 75% except for hydrothermally treated sample G0N, perhaps because G0N had a relatively low set recovery even without thermal fixing. The thermal fixing treatment enhanced the depolymerization of amorphous cell-wall polymers, which are believed to be the cause of spring-back effects in wood, as well as softening the remaining lignin and leading to probable formation of covalent bonds in the deformed position. (Chen et al., 2017. *Sci. Adv.,* 3(9), e1701735, Wang et al., 2021.) Additionally, the residual lignin compromise the formability of the cellulose scaffolds in wet conditions. It was reported that densified wood with alkaline delignification under the same thermal-fixing conditions had a $SR_{wf}$ of 7.5%, indicating that thermal fixing treatment had similar fixation effect on densified wood whether pretreated by carbonate or sodium hydroxide. (Wang et al., 2021.)

Example 9: Mechanical Properties of Densified Wood Boards Through $O_2$-Delig The large basswood board (Bl-Na) and one basswood veneer (V4-Na) were densified after oxygen delignification. The densification substantially improved mechanical strength as listed in Table 9. The basswood board had a bending strength of over 350 MPa and bending MOE over 27 GPa, and tensile strength and MOE over 520 MPa and 136 MPa, respectively. The basswood board had a tensile strength and MOE of approximately 310 MPa and 450 MPa, respectively.

TABLE 9

Mechanical tensile and bending strength of densified wood boards through $O_2$-delig.

| | | Bending | | Tensile | |
|---|---|---|---|---|---|
| Wood samples | ρ (g/cm³) | MOR (MPa) | MOE (GPa) | Stress (MPa) | MOE (MPa) |
| V4-Na | 1.00 | | | 310.2 ± 7.9 | 43.2 ± 2.9 |
| Bs-Na | 1.36 | 352.9 ± 46.6 | 27.6 ± 3.2 | 524.8 ± 29.2 | 136.0 ± 8.7 |

Example 10: Wood Treatment Using Real Black Liquor for Densification

Poplar wood blocks of the same dimension described earlier of 100 mm (longitudinal) by 10 mm (radial) by 20 mm (tangential) were used to test wood treatment using real black liquor. Laboratory NaOH pulping liquor was collected and used. The alkali composition was determined by titration: $Na_2CO_{3=9.6}$ g/L, NaOH=55.4 g/L. The treated wood was then densified at 3 and 5 MPa. The wood blocks were air dried as opposed to the wet condition in Examples 5 and 7 to avoid damage by steam rupture from hot pressing.

The results indicate that black liquor treatment can effectively densify wood to achieve significant improvement in wood bending strength similar to carbonate treatment shown in Table 10 and NaOH treatment (FIGS. 3A-3C). For example, the MOR and MOE of BlqP3N treated by black liquor are similar to G15P3N treated by pure carbonate solution pressed at the same 3 MPa; however, it was pressed at 5 MPa decreased bending strength. Early study indicates that high alkali charge can reduce the mechanical strength of densified wood as reported previously. (Wang et al., 2020.) It is possible that the laboratory black liquor contained a significant amount of NaOH that may have been the cause of the decreased mechanical strength of BlqP5N from pressing at 5 MPa.

TABLE 10

Mechanical bending strength of densified wood blocks.

| Wood samples [1] | ρ ($g/cm^3$) | Bending MOR (MPa) | Bending MOE (GPa) | HB (MPa) |
|---|---|---|---|---|
| Pristine poplar | 0.463 ± 0.02 | 88.5 ± 5.1 | 6.5 ± 0.8 | 14.8 ± 2.5 |
| BLqP3N | 0.869 | 122.5760956 | 15.09112 | |
| BLqP5N | 0.832 | 90.74611812 | 9.612134 | |

[1] P3N, and P5N stand for pressing without stop bars at 3, 5 MPa, respectively.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for producing a structural material from lumber, the method comprising:

- impregnating the lumber with an aqueous solution comprising a base by soaking the lumber in the aqueous solution comprising the base, whereby the aqueous solution comprising the base infiltrates the lumber, and then removing the lumber from the aqueous solution comprising the base;
- exposing the impregnated lumber to an environment having an oxygen partial pressure greater than that of ambient air at an elevated delignification temperature in a pressurized vessel to partially delignify the lumber; and
- compressing the lumber at an elevated compression temperature to densify the lumber.

2. The method of claim 1, wherein the lumber has a rectangular prism shape with a thickness dimension of at least 1 mm, a width dimension of at least 10 mm, and a length dimension of at least 10 cm.

3. The method of claim 1, wherein the lumber has a rectangular prism shape with a thickness dimension of at least 10 mm, a width dimension of at least 100 mm, and a length dimension of at least 100 cm.

4. The method of claim 1, wherein the base is a hydroxide, ammonia, urea, or a mixture of two or more thereof.

5. The method of claim 1, wherein the base is sodium hydroxide, calcium hydroxide, potassium hydroxide, or a mixture of two or more thereof.

6. The method of claim 5, wherein the concentration of the base in the aqueous solution is in the range from 2 g/L to 60 g/L.

7. The method of claim 5, wherein the aqueous solution further comprises magnesium sulfate.

8. The method of claim 7, wherein the concentration of the base in the aqueous solution is in the range from 2 g/L to 60 g/L and the concentration of magnesium sulfate in the aqueous solution is in the range from 3 g/L to 8 g/L.

9. The method of claim 1, wherein the elevated delignification temperature is in the range from 60° C. to 120° C. and the environment having an oxygen partial pressure greater than that of ambient air has an oxygen partial pressure is in the range from 0.25 MPa to 1.25 MPa.

10. The method of claim 9, wherein the lumber is exposed to the environment having an oxygen partial pressure greater than that of ambient air for a period of three hours or less.

11. The method of claim 9, wherein the lumber is compressed for a period of no greater than ten hours.

12. The method of claim 1, wherein the partially delignified lumber has a moisture content and the elevated compression temperature is greater than the glass transition temperature of lignin at said moisture content.

13. The method of claim 1, wherein the elevated compression temperature is in the range from 50° C. to 200° C.

14. The method of claim 1, wherein impregnating the lumber with the aqueous solution comprising the base comprises immersing the lumber in the aqueous solution comprising the base for a period of time in the range from 12 hours to 48 hours.

15. The method of claim 14, wherein the lumber is immersed in the aqueous solution at a temperature in the range from 21° C. to 25° C.

16. The method of claim 1, wherein the extent of the partial delignification of the lumber is in the range from 15% to 50% based on Klason lignin mass.

* * * * *